(12) United States Patent
Mossman

(10) Patent No.: US 12,120,981 B2
(45) Date of Patent: Oct. 22, 2024

(54) REEL ASSEMBLY WITH REMOVABLE TINES AND METHOD OF USE

(71) Applicant: DEERE & COMPANY, Moline, IL (US)

(72) Inventor: Michael W. Mossman, Silvis, IL (US)

(73) Assignee: DEERE & COMPANY, Moline, IL (US)

( * ) Notice: Subject to any disclaimer, the term of this patent is extended or adjusted under 35 U.S.C. 154(b) by 1007 days.

(21) Appl. No.: 16/919,651

(22) Filed: Jul. 2, 2020

(65) Prior Publication Data
US 2022/0000030 A1  Jan. 6, 2022

(51) Int. Cl.
*A01D 57/02*  (2006.01)

(52) U.S. Cl.
CPC .................................. *A01D 57/02* (2013.01)

(58) Field of Classification Search
CPC ..................................................... A01D 57/02
USPC .............................................................. D8/13
See application file for complete search history.

(56) References Cited

U.S. PATENT DOCUMENTS

| | | | | |
|---|---|---|---|---|
| 4,882,899 A * | 11/1989 | Jasper | ..................... | A01D 57/02 56/220 |
| 5,027,907 A * | 7/1991 | Delyea | ................... | A01B 23/02 403/284 |
| 6,199,357 B1 * | 3/2001 | Bloom | ................... | A01D 57/02 56/220 |
| 7,124,564 B2 * | 10/2006 | Glazik | ................... | A01D 57/02 56/220 |
| 7,650,737 B1 * | 1/2010 | Lovett | ................... | A01D 57/02 56/220 |
| 10,194,590 B2 | 2/2019 | Honey et al. | | |
| 10,383,281 B2 | 8/2019 | Jasper | | |
| 2007/0289280 A1 * | 12/2007 | Marquardt | ............. | A01D 57/02 56/16.1 |
| 2014/0260171 A1 | 9/2014 | McGehee et al. | | |
| 2021/0037711 A1 * | 2/2021 | Dreyer | ................... | A01D 57/02 |

FOREIGN PATENT DOCUMENTS

| DE | 2235606 A1 * | 2/1973 | ............ A01D 80/02 |
|---|---|---|---|
| EP | 0347201 A1 | 12/1989 | |

OTHER PUBLICATIONS

"5 Finger Quick Tine", Ag Solutions, 1 page, publicly available as early as Aug. 2019.
Aug. 2019 New Product Rollout, Ag Proud, www.agproud.com/articles/31813-august-2019-new-product-rollout, 6 pages, Aug. 13, 2019.
"May Wes Bat Wing Paddle Tine and Replacement Snap-On Tine", Harvesting Equipment, 9 pages, Jul. 11, 2019.
"Replacement Tines", Quick Finger, 1 page, Applicant acknowledges contents in image were publicly known as of Feb. 3, 2020.

* cited by examiner

*Primary Examiner* — Alicia Torres
(74) *Attorney, Agent, or Firm* — Taft Stettinius & Hollister LLP; Stephen F. Rost

(57) ABSTRACT

A reel assembly for a harvester head of an agricultural machine includes a carrier bar, standard tines coupled to the carrier bar, and gap tines removably coupled to the carrier bar and such that the gap tines do not penetrate an outer surface of the carrier bar. The gap tines contact the standard tines to prevent rotation of the gap tines relative to the carrier bar during operation of the work machine.

19 Claims, 16 Drawing Sheets

REEL ASSEMBLY WITH REMOVABLE TINES AND METHOD OF USE

FIELD OF THE DISCLOSURE

The present disclosure relates to agricultural machinery with a harvester header, and more particularly to a reel assembly of the harvester header.

BACKGROUND

Work machines and in particular agricultural machines may have a harvester header including a cutter bar to cut crops. The harvester header may include a reel assembly which rotates tines or fingers to move and lift crops cut by the cutter bar and so that the crops may be processed by other components of the agricultural machine. The fingers or tines may be less effective than desired as a result of cut crop or other material passing through gaps between the tines or fingers.

What is need therefore is gap-filling tines that may be efficiently added to or removed from the reel assembly. The gap-filling tines should cooperate effectively with the standard tines and other components of a conventional agricultural machine to move and lift the cut crops and other material.

SUMMARY

In an illustrative embodiment, a reel assembly for a harvester head of agricultural machine comprises: a platform; a reel assembly coupled to the platform, the reel assembly including: a central bar rotatable relative to the platform; a carrier bar coupled to central bar and configured to rotate about the central bar; a first standard tine coupled to the carrier bar; and a first gap tine removably coupled to the carrier bar and positioned adjacent the first standard tine; wherein the first standard tine is configured to directly contact the first gap tine when the first gap tine is coupled to the carrier bar to prevent rotation of the first gap tine relative to the carrier bar.

In some embodiments, the carrier bar includes an outer surface; and the first gap tine is coupled to the outer surface of the carrier bar without penetrating the outer surface of the carrier bar.

In some embodiments, the first gap tine includes: a main body including a first end removably coupled to the carrier bar and a second end extending away from the carrier bar when the first end is coupled to the carrier bar, and a first side extending away from the main body and configured to contact the first standard tine to prevent rotation of the first gap tine about the carrier bar.

In some embodiments, the first standard tine includes a c-shaped portion coupled to the carrier bar. The c-shaped portion of the first standard tine includes a first end, a second end, and a groove defined between the first end and the second end; and wherein the first side of the first gap tine is positioned in the groove when the first gap tine is coupled to the carrier bar.

In some embodiments, the reel assembly further comprises a second standard tine that is coupled to the carrier bar and spaced apart from the first standard tine; and the first gap tine includes a second side coupled to and extending away from the main body opposite the first side, and the second side is configured to contact the second standard tine to prevent rotation of the first gap tine about the carrier bar.

In some embodiments, the reel assembly further comprises a second gap tine; and a third standard tine that is coupled to the carrier bar and spaced apart from the first and second standard tines; wherein the second gap tine includes a first side configured to contact the second standard tine to prevent rotation of the second gap tine about the carrier bar and a second side configured to contact the third standard tine to prevent rotation of the second gap tine about the carrier bar.

In some embodiments, the first end of the first gap tine defines an arcuate deflectable portion configured to removably couple the first gap tine to the carrier bar.

In some embodiments, the first end of the first gap tine includes: a first portion, a second portion pivotable relative to the first portion to move the first end between an open position and a closed position; and a latch coupled to the second portion; and when the first end is in the closed position, the latch fixes the second portion relative to the first portion.

In some embodiments, the first side of the first gap tine includes an aperture; and the first standard tine is positioned in the aperture when the first gap tine is coupled to the carrier bar.

In some embodiments, the first side of the first gap tine is removably coupled to the main body of the first gap tine.

In another illustrative embodiment, a reel assembly for a harvester head of agricultural machine comprises: a carrier bar; a first standard tine and a second standard tine each coupled to the carrier bar; a gap defined between the first standard tine and the second standard tine; and a gap tine removably coupled to the carrier bar and positioned in the gap; wherein the gap tine is configured to contact the first standard tine and the second standard tine to limit rotation of the gap tine relative to the carrier bar.

In some embodiments, the carrier bar includes an outer surface; and the gap tine is coupled to the outer surface of the carrier bar and without penetrating the outer surface of the carrier bar.

In some embodiments, the gap tine includes: a main body extending from a first end thereof that is removably coupled to the carrier bar to a second end thereof opposite the first end, a first side coupled to and extending away from the main body and configured to contact the first standard tine to limit rotation of the gap tine about the carrier bar, and a second side coupled to and extending away from the main body opposite the first side, and configured to contact the second standard tine to limit rotation of the gap tine about the carrier bar.

In some embodiments, the first side and second side of the gap tine are removably coupled to the main body of the gap tine.

In some embodiments, the first standard tine and second standard tine each include a first end fastened to the carrier bar; the first side of the gap tine extends along the carrier bar into a groove defined in the first end of the first standard tine; and the second side of the gap tine extends along the carrier bar into a groove defined in the first end the second standard tine.

In some embodiments, the first side of the gap tine includes a first aperture and the second side of the gap tine includes a second aperture; the first standard tine is positioned in the first aperture when the gap tine is coupled to the carrier bar; and the second standard tine is positioned in the second aperture when the gap tine is coupled to the carrier bar.

In some embodiments, the gap time is a first gap tine. The reel assembly further comprises: a second gap tine including: a main body having a first end removably coupled to the carrier bar, a first side and a second side each extending from the main body opposite each other, a first aperture defined in the first side, and a second aperture defined in the second side; and the second standard tine is positioned in the first aperture of the second gap tine; and the first aperture of the second gap tine is positioned above the second aperture of the first gap tine when the second gap tine is coupled to the carrier bar.

In some embodiments, the gap tine includes a main body having a first end snap-fittingly coupled to the carrier bar.

In some embodiments, the gap tine includes a main body having a first end removably coupled to the carrier bar; wherein the first end includes: a first portion, a second portion pivotable relative to the first portion between an open position and a closed position of the first end; and wherein the first end is lockable in the closed position.

In another illustrative embodiment, a method for a reel assembly of an agricultural machine comprises: coupling a gap tine to a carrier bar between a first standard tine and a second standard tine that are fixedly coupled to the carrier bar; engaging the gap tine with cut crop during operation of the agricultural machine; and urging the gap tine against the first standard tine and the second standard tine to limit rotation of the gap tine relative to the carrier bar.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein.

Corresponding reference numerals are used to indicate corresponding parts throughout the several views.

DETAILED DESCRIPTION

The embodiments of the present disclosure described below are not intended to be exhaustive or to limit the disclosure to the precise forms in the following detailed description. Rather, the embodiments are chosen and illustratively described so that others skilled in the art may appreciate and understand the principles and practices of the present disclosure.

Figure 1:
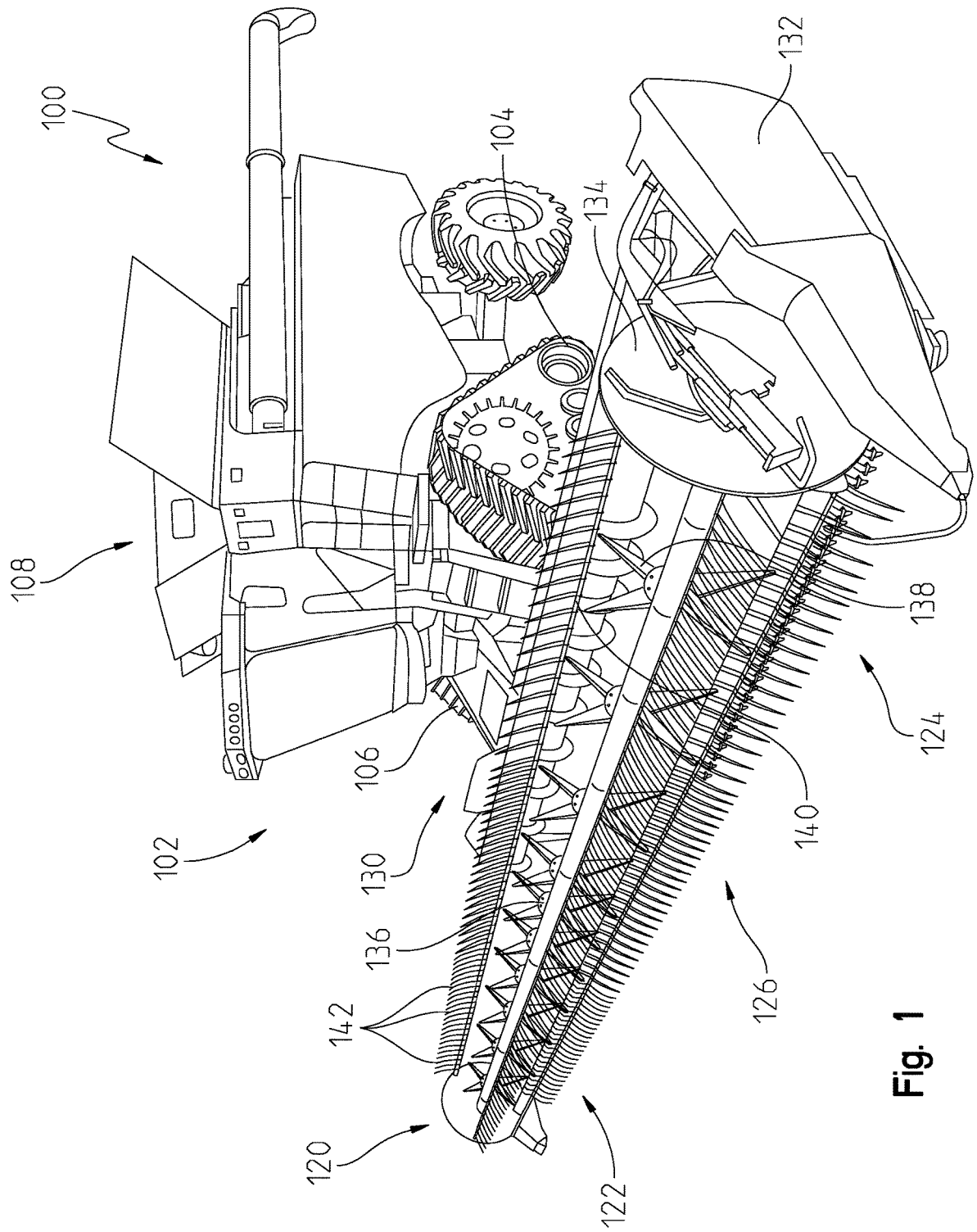
FIG. 1 illustrates a perspective view of a work machine with a harvester head having a reel assembly.

FIG. 1 illustrates a work machine 100, in this example an agricultural work machine 100. The work machine 100 includes a harvester head 120, an operator cab 102, traction devices 104, 106, and a storage area 108. An engine of the work machine 100 can power movement of the traction devices 104, 106 which will move the work machine 100 and harvester head 120. The harvester head 120 has a left side 122, a right side 124 and a central portion 126. Crops cut by the left and right sides 122, 124 of the harvester head 120 are moved to the central portion 126 where they are fed into a feed section 130 for processing and transport to the storage area 108 of the combine 100.

The harvester head 120 includes a platform 132 configured to cooperate with other components to move cut crop through the work machine 100. In the illustrative embodiment shown in FIG. 1, the platform 132 is a draper platform having draper belts and an auger configured to move cut crop to the feed section 130. The work machine 100 includes a reel assembly 134 coupled to the platform 132. The reel assembly 134 cooperates with the platform 132 to move cut crop. While the harvester head 120 illustratively includes the platform 132 as shown in FIG. 1, it should be appreciated that any harvester head is suitable for use with the reel assembly 134 described herein, so long as the harvester head facilitates rotation of the reel assembly 134.

In the illustrative embodiment, the reel assembly 134 includes a central bar 136 coupled to the platform 132. The central bar 136 is rotatable relative to the platform 132 about an axis of rotation of the central bar 136. The central bar 136 is fixedly coupled to a plurality of arms 138 that rotate with the central bar 136. In some embodiments, the distal ends of the arms 138 are fixedly coupled to carrier bars 140 that rotate about the central bar 136. In some embodiments, support-frames are positioned at the distal ends of the arms 138 and the carrier bars 140 are couple to the support-frames. In any event, the carrier bars 140 are configured to rotate about the central bar 136 during rotation of the central bar 136 about its axis. A plurality of standard tines 142 are coupled to each carrier bar 140. It should be appreciated that any reel assembly is suitable for this disclosure, so long as the reel assembly includes a carrier bar structured for use with the standard tines 142 and gap tines which will be described in greater detail below.

Figure 2:
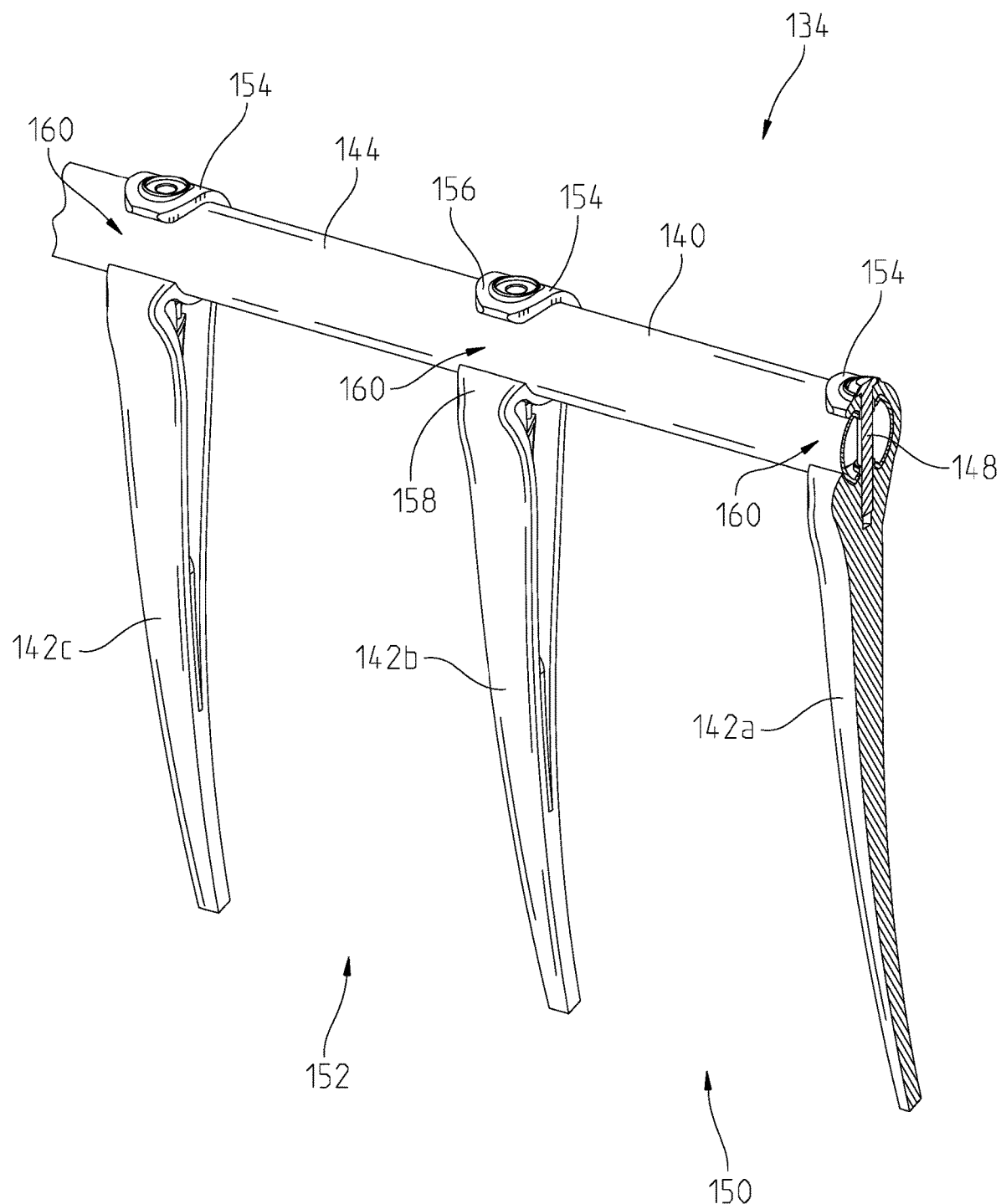
FIG. 2 illustrates a perspective cross-section view of a portion of a carrier bar of the reel assembly, showing that standard tines of the work machine are coupled to the carrier bar.

Referring now to FIG. 2, a plurality of standard tines 142 are coupled to the carrier bar 140. The carrier bar 140 includes an outer surface 144. Each standard tine 142 includes a c-shaped portion 154 extending partially around the outer surface 144 of the carrier bar 140. The c-shaped portion 154 includes a first end 156, a second end 158, and a groove 160 defined between the first end 156 and the second end 158. In the illustrative embodiment, the outer surface 144 of the carrier bar 140 cooperates with the first and second ends 156, 158 of the c-shaped portion 154 to define the groove 160.

In FIG. 2, a first standard tine 142a is shown in cross-section. In the cross-section view, it is clear that a portion of the standard tine 142a penetrates the outer surface 144 of the carrier bar 140. In the illustrative embodiment, a fastener portion 148 of the standard tine 142a extends through an aperture of the carrier bar 140 to couple the standard tine 142a to the carrier bar 140. It should be appreciated that in the illustrative embodiment, each standard tine 142a-c is coupled to the carrier bar 140 in a similar fashion.

Further, it should appreciated that throughout the disclosure, reference numbers having a common base number (for example 142a-c) may be positioned in different locations on the work machine but have common structure. It should also be appreciated that any description of a base number alone applies to each component that includes that base number in its reference number. Reference numbers differing from one another by only an apostrophe (for example 500 and 500'), may have one or more similar components with differing structures.

As shown in FIG. 2, the reel assembly 134 includes the first standard tine 142a, a second standard tine 142b, and a third standard tine 142c. A first gap 150 is defined between the first standard tine 142a and the second standard tine 142b, and a second gap 152 is defined between the second standard tine 142b and the third standard tine 142c.

Figure 3A:
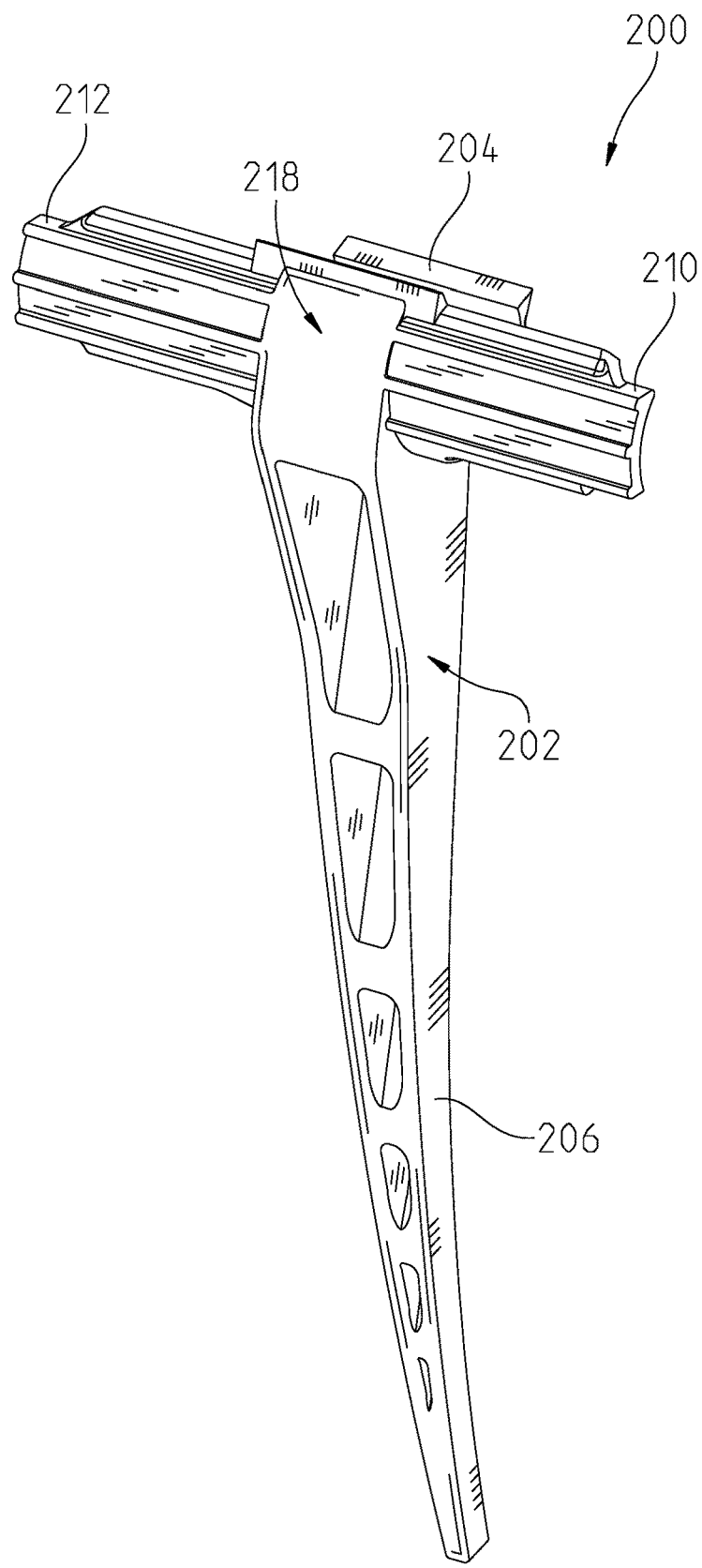
FIG. 3A illustrates a front perspective view of a gap tine.
Figure 3B:
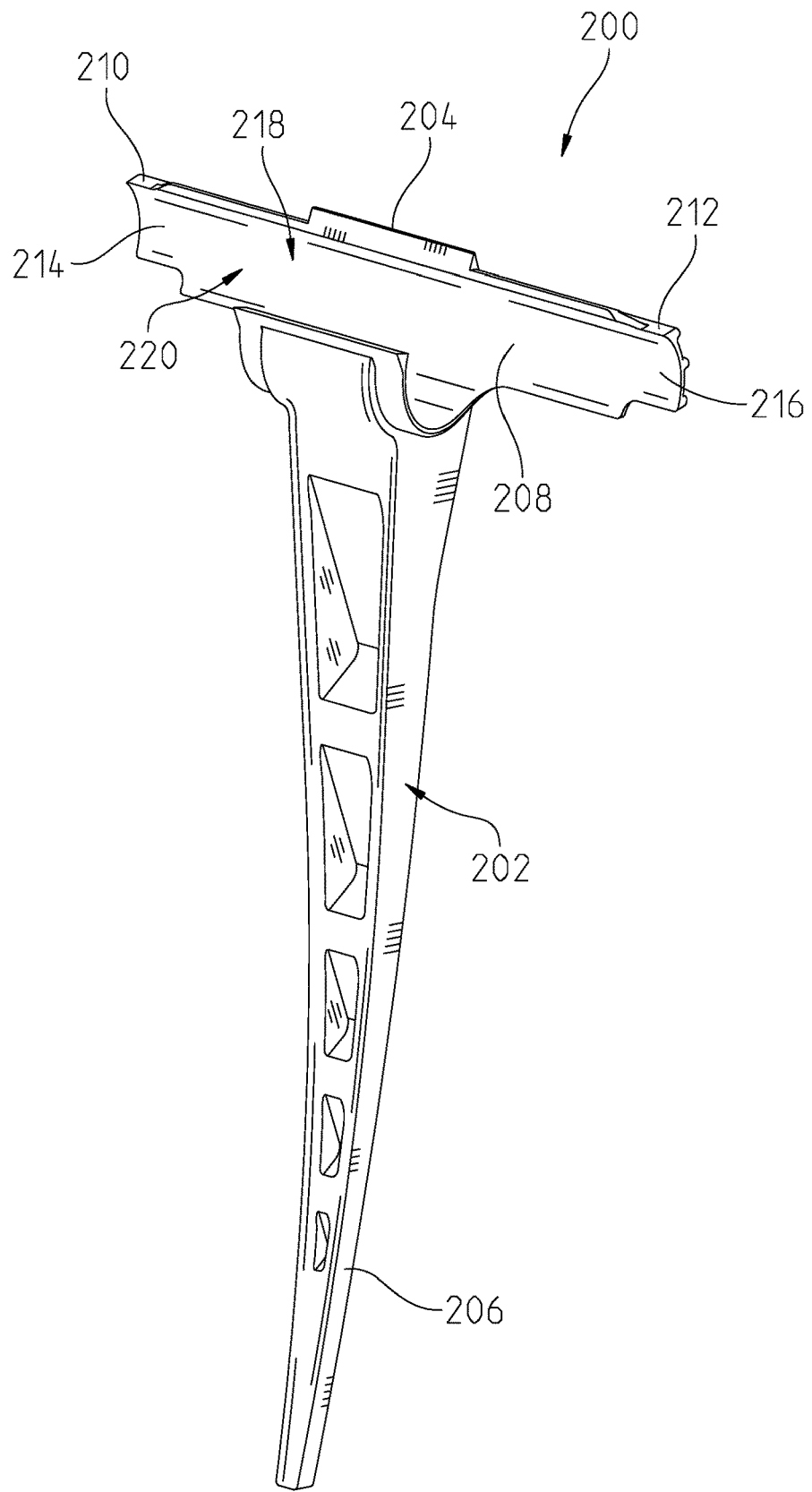
FIG. 3B illustrates a rear perspective view the gap tine shown in FIG. 3A.
Figure 3C:
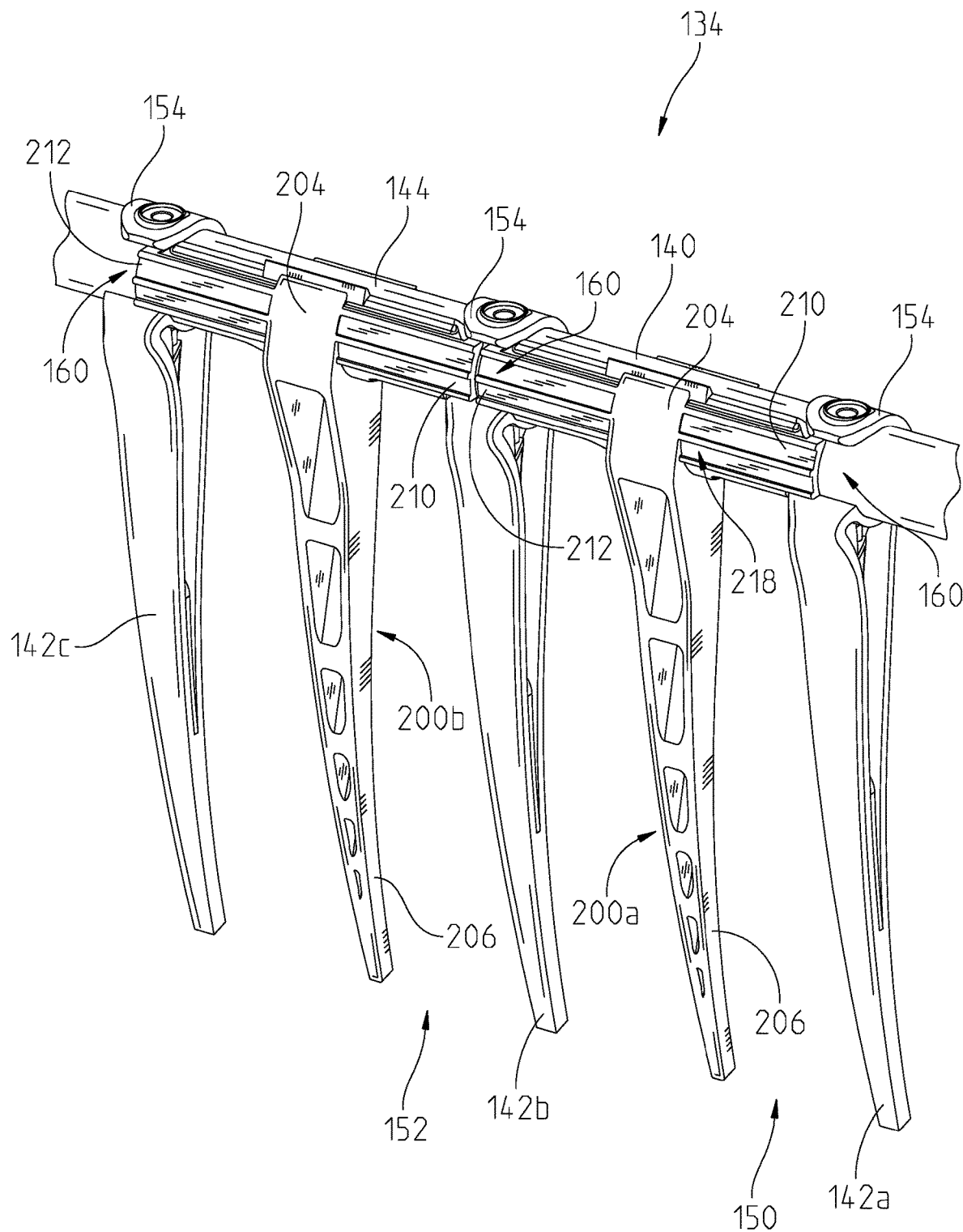
FIG. 3C illustrates a perspective view the gap tine of FIGS. 3A-B coupled to the carrier bar and positioned between standard tines.

FIGS. 3A-C illustrate a gap tine 200. As shown in FIG. 3C, a first gap tine 200a is positioned in the first gap 150, and a second gap tine 200b is positioned in the second gap 152. In other words, the first gap tine 200a is positioned directly adjacent and between the first and second standard tines 142a, 142b, and the second gap tine 200b is positioned directly adjacent and between the second and third standard tines 142b, 142c.

FIG. 3A illustrates a front view of the gap tine 200, and FIG. 3B illustrates a rear view of the gap tine 200. As shown in FIGS. 3A-B, each gap tine 200 includes a main body 202 including a first end 204 removably coupled to the carrier bar 140 and a second end 206 extending away from the carrier bar 140 when the first end 204 is coupled to the carrier bar 140. The first end 204 is arcuate and includes an inner surface 208 sized and shaped to correspond with the outer surface 144 of the carrier bar 140.

In the illustrative embodiment, the first end 204 is a deflectable, resilient portion that may be removably coupled to the carrier bar 140. The first end 204 is arranged in a snap-fit connection with the carrier bar 140 to couple the gap tine 200 to the carrier bar 140. Thus, the first end 204 may be referred to as a snap-fit mechanism. With this structure, the gap tine 200 is coupleable to the outer surface 144 of the carrier bar 140 without penetrating the outer surface 144 of the carrier bar 140.

The second end 206 of the main body 202 has a length that is substantially the same as a length of a corresponding end of the standard tine 142. The second end 206 may include indents to improve manufacturability or to provide additional structural benefits. The second end 206 is configured to interact with and move cut crop and other materials during operation of the work machine 100.

In the illustrative embodiment, the gap tine 200 includes a first side 210 and a second side 212 each extending away from the main body 202 in opposite directions from one another. The first side 210 and the second side 212 extend away from the main body 202 in a direction generally perpendicular to the length or direction of extension of the second end 206. In the illustrative embodiment, the first side 210 and the second side 212 are formed as a single monolithic component with the first end 204. The first side 210, the second side 212, and the first end 204 of the main body 202 cooperate to define a head portion 218. The first side 210 includes an inner surface 214, and the second side 212 includes an inner surface 216. The inner surfaces 214, 216, and 208 cooperate to define an inner surface 220 of the head portion 218. The inner surface 220 of the head portion 218 is sized and shaped to correspond with the outer surface 144 of the carrier bar 140. As suggested by FIG. 3C, the inner surface 220 of the head portion 218 is in contact with the carrier bar 140 when the gap tine 200 is coupled to the carrier bar 140.

As shown in FIG. 3C, at least a portion of the first side 210 of the first gap tine 200a is positioned in the groove 160 of the c-shaped portion 154 of the first standard tine 142a when the first gap tine 200a is coupled to the carrier bar 140. When the tines 142, 200 contact cut crop and other material, the tines 142, 200 are urged to rotate relative to the carrier bar 140. Because at least a portion of the first side 210 of the first gap tine 200a is positioned in the groove 160 of the c-shaped portion 154 of the first standard tine 142a, the first side 210 of the first gap tine 200a is configured to directly contact the c-shaped portion 154 of the first standard tine 142a to prevent rotation of the first gap tine 200a about the carrier bar 140.

The first gap tine 200a is prevented from rotating relative to the carrier bar 140 without penetrating the outer surface 144 of the carrier bar 140. In other words, it should be appreciated that no fasteners or other components of the gap tines 200 penetrate the carrier bar 140 to couple the gap tines 200 to the carrier bar 140. Likewise, no fasteners or other components of the gap tines 200 penetrate the carrier bar 140 to prevent rotation of the gap tines 200 relative to the carrier bar 140. Therefore, the gap tines 200 are removable from the carrier bar 140 without the use of additional tools such as a screw driver or drill.

As shown in FIG. 3C, at least a portion of the second side 212 of the first gap tine 200a is positioned in the groove 160 of the c-shaped portion 154 of the second standard tine 142b when the first gap tine 200a is coupled to the carrier bar 140. The second side 212 of the first gap tine 200a is configured to directly contact the c-shaped portion 154 of the second standard tine 142b to prevent rotation of the first gap tine 200a about the carrier bar 140.

Further, at least a portion of the first side 210 of the second gap tine 200b is positioned in the groove 160 of the c-shaped portion 154 of the second standard tine 142b when the second gap tine 200b is coupled to the carrier bar 140. The first side 210 of the second gap tine 200b is configured to directly contact the c-shaped portion 154 of the second standard tine 142b to prevent rotation of the second gap tine 200b about the carrier bar 140.

Further, at least a portion of the second side 212 of the second gap tine 200b is positioned in the groove 160 of the c-shaped portion 154 of the third standard tine 142c when the second gap tine 200b is coupled to the carrier bar 140. The second side 212 of the second gap tine 200b is configured to directly contact the c-shaped portion 154 of the third standard tine 142c to prevent rotation of the second gap tine 200b about the carrier bar 140.

Figure 4A:
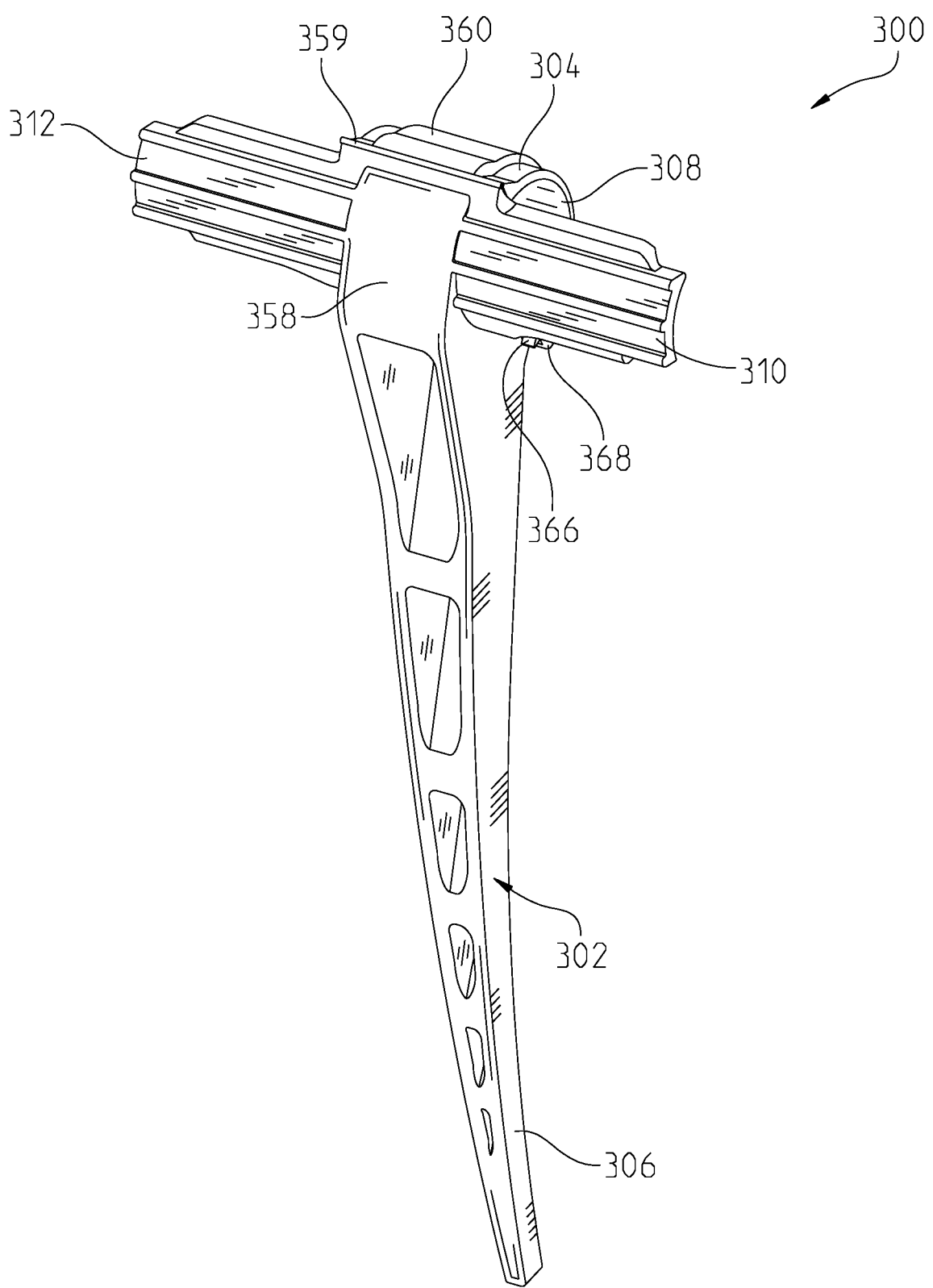
FIG. 4A illustrates a front perspective view of another gap tine.
Figure 4B:
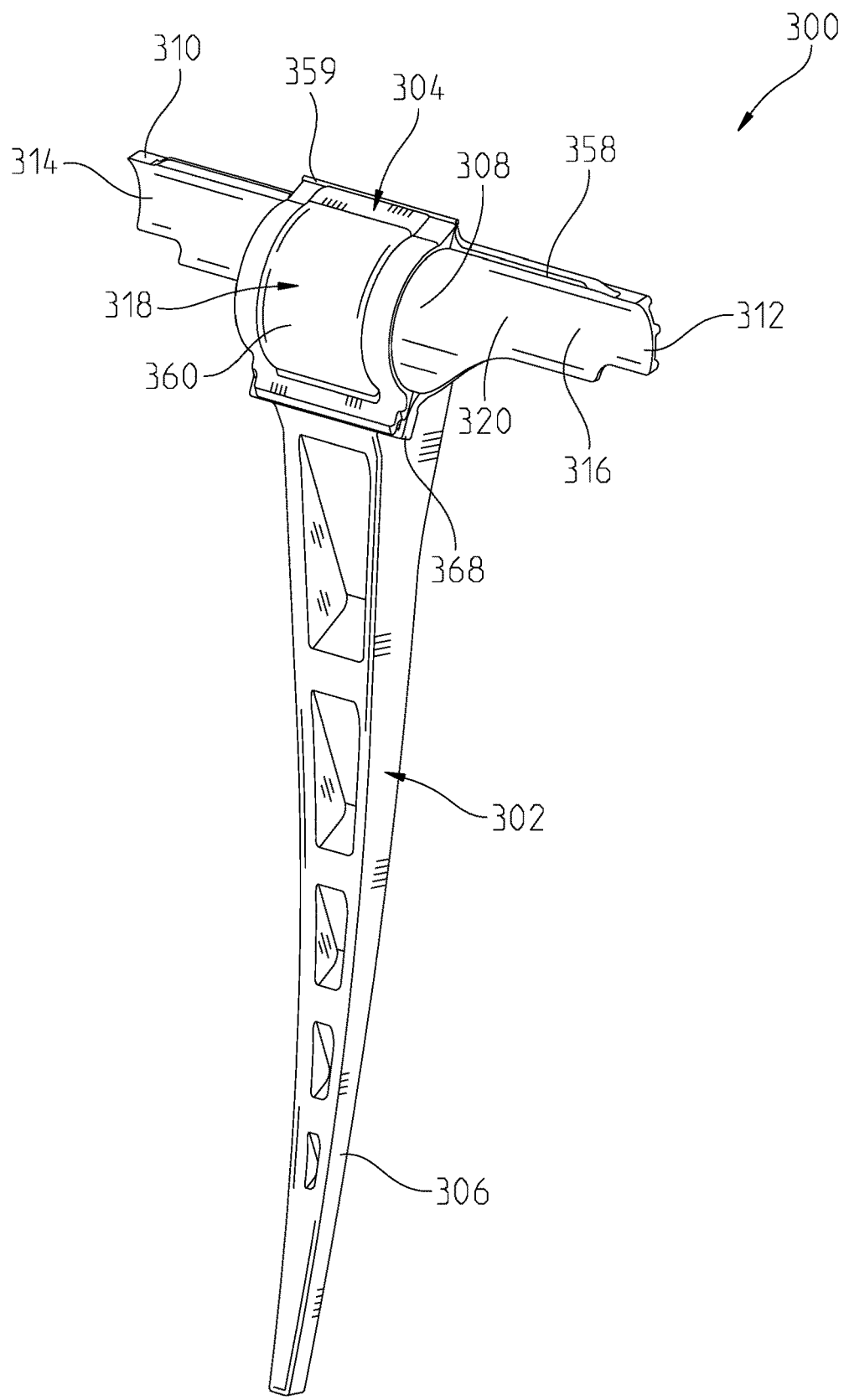
FIG. 4B illustrates a rear perspective view the gap tine shown in FIG. 4A.
Figure 4C:
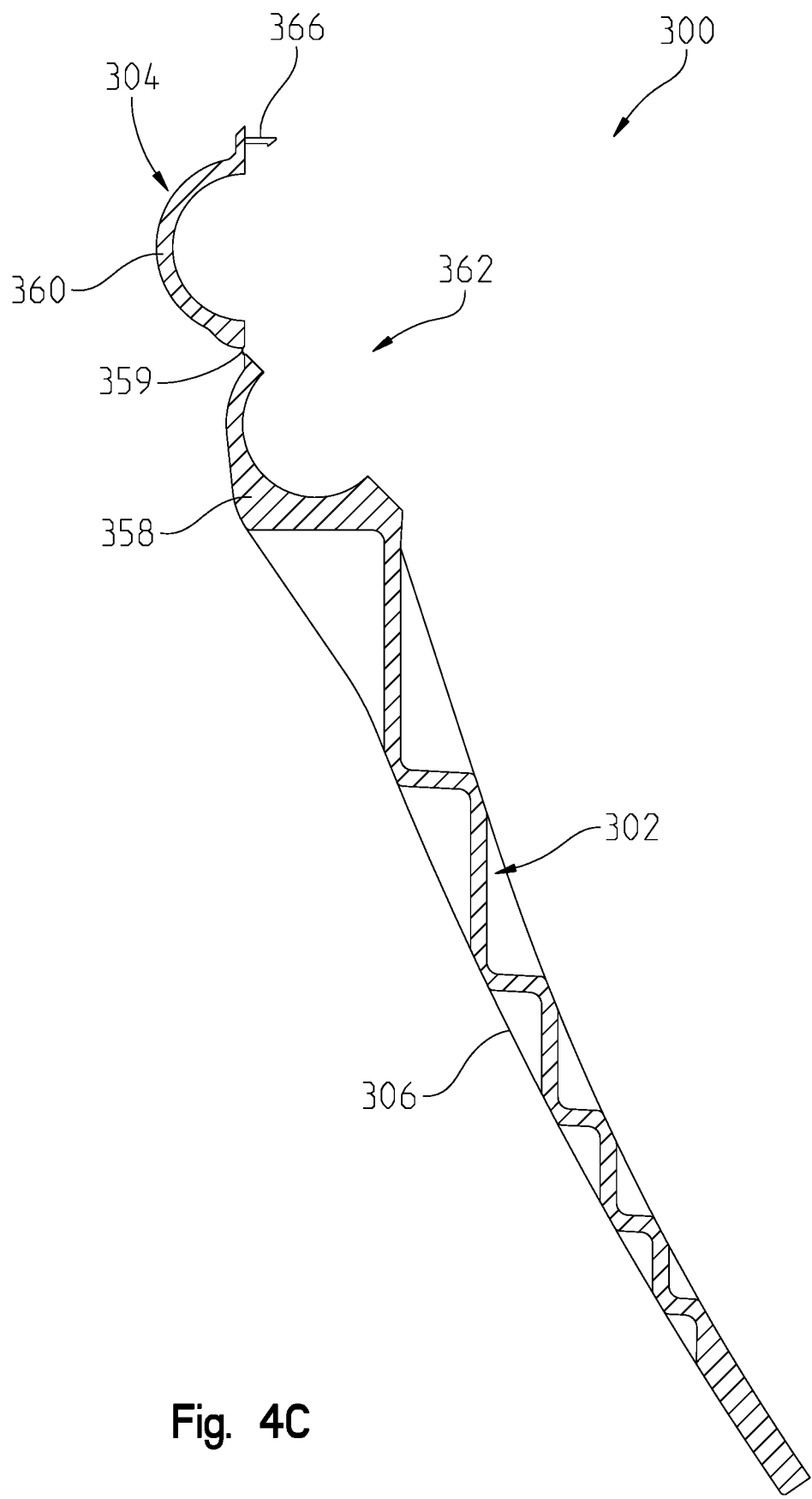
FIG. 4C illustrates a cross-section view of the gap tine of FIGS. 4A-B, showing the first end of the gap tine in an open position.
Figure 4D:
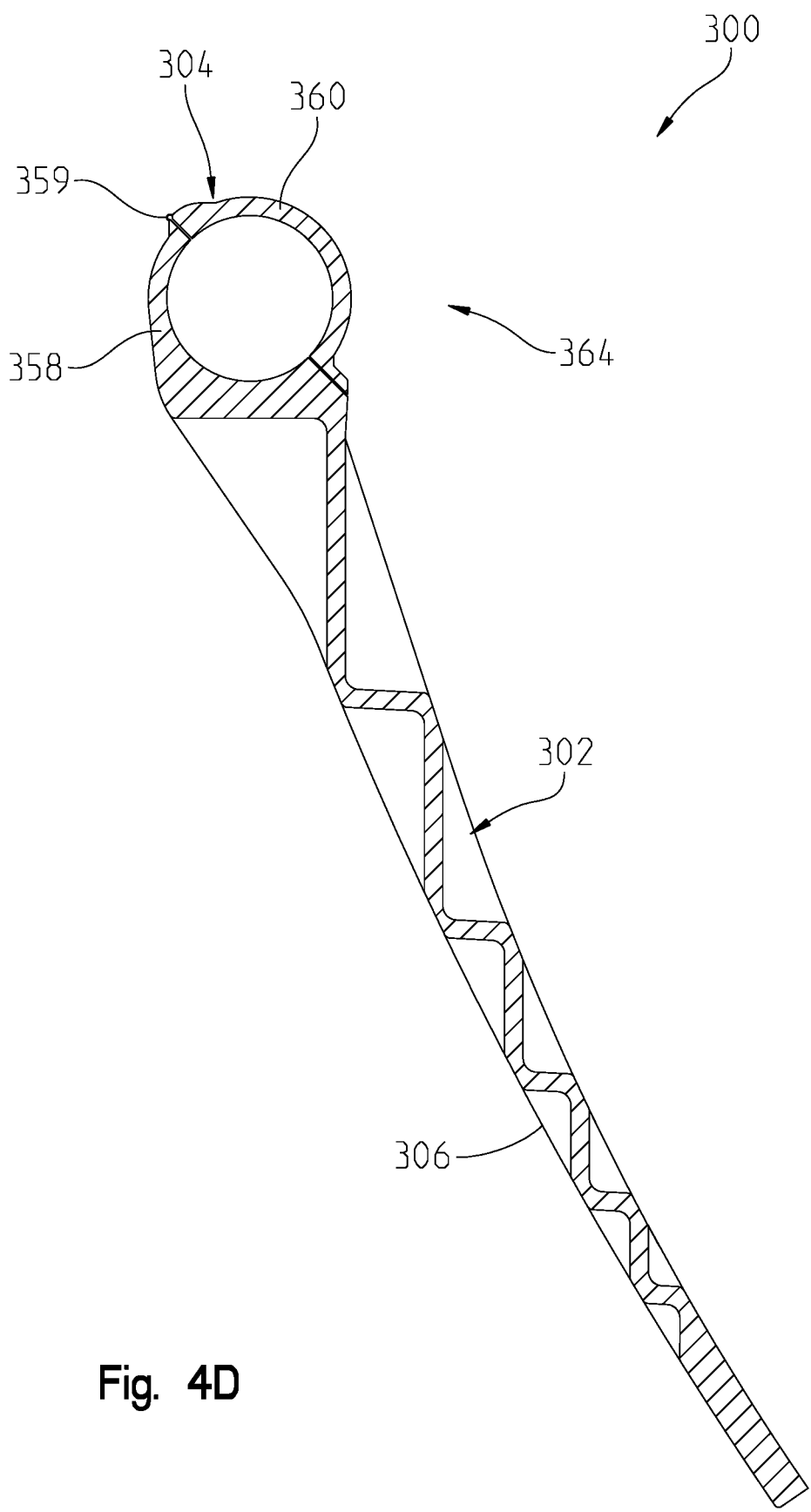
FIG. 4D illustrates a cross-section view of the gap tine of FIGS. 4A-B, showing the first end of the gap tine in a closed position.
Figure 4E:
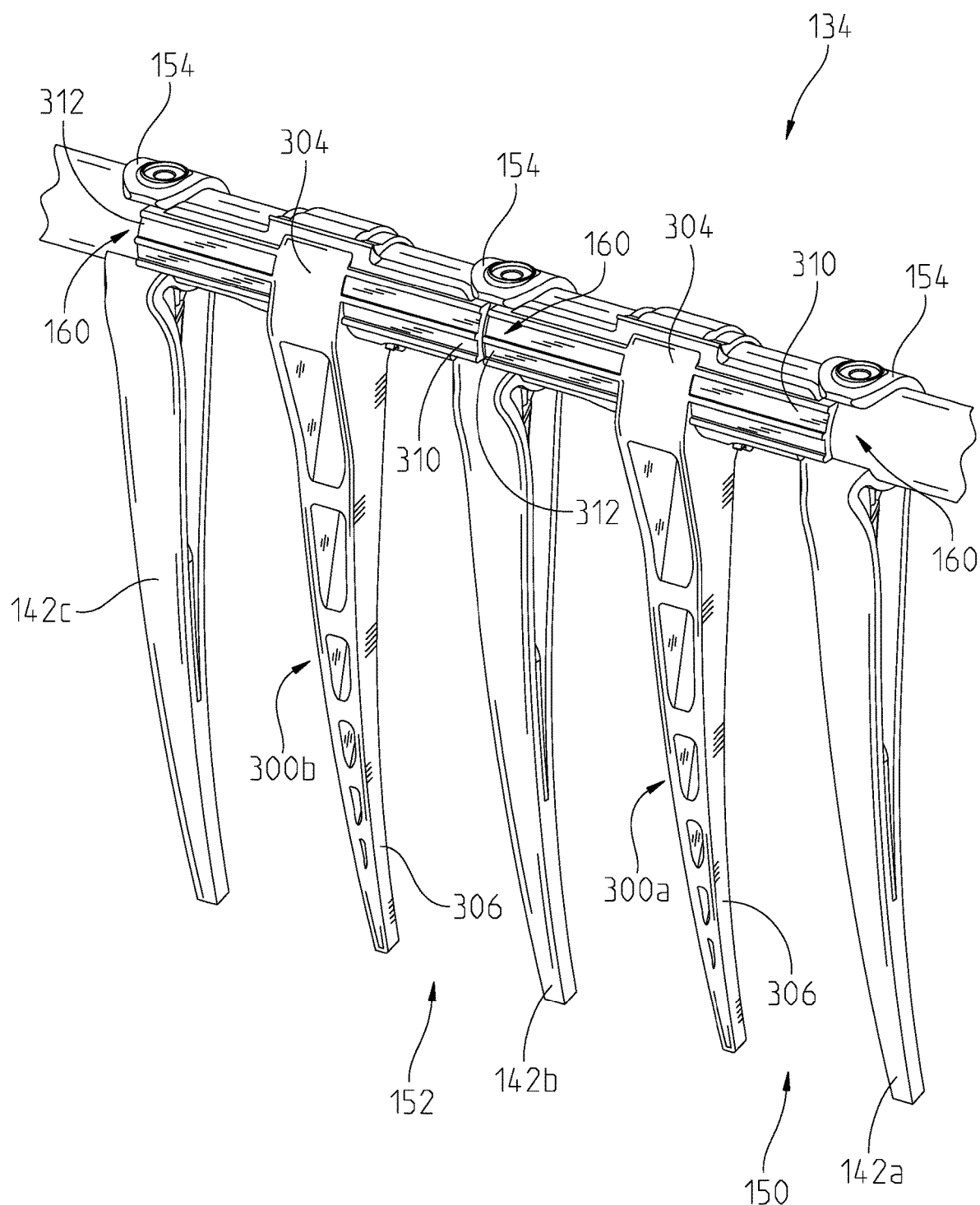
FIG. 4E illustrates a perspective view the gap tine FIGS. 4A-D coupled to the carrier bar and positioned between standard tines.

Referring now to FIGS. 4A-E, a gap tine 300 is shown. As shown in FIG. 4E, a first gap tine 300a is positioned in the first gap 150, and a second gap tine 300b is positioned in the second gap 152. In other words, the first gap tine 300a is positioned directly adjacent and between the first and second standard tines 142a, 142b, and the second gap tine 300b is positioned directly adjacent and between the second and third standard tines 142b, 142c.

FIG. 4A illustrates a front view of the gap tine 300, and FIG. 4B illustrates a rear view of the gap tine 300. As shown in FIGS. 4A-B, each gap tine 300 includes a main body 302 including a first end 304 removably coupled to the carrier bar 140 and a second end 306 extending away from the carrier bar 140 when the first end 304 is coupled to the carrier bar 140. The first end 304 includes an inner surface 308 sized and shaped to correspond with the outer surface 144 of the carrier bar 140.

In the illustrative embodiment, the first end 304 is a lockable hinge mechanism such as, for example, a lockable living hinge. In some embodiments, the first end 304 may be a lockable pin hinge. The first end 304 of the gap tine 300 includes a first portion 358, a second portion 360, and a hinge 359 coupling together the first portion 358 and the second portion 360. The first portion 358 of the first end 304 is fixed relative to the second end 306 of the gap tine 300. In the illustrative embodiment, the first portion 358 of the first end 304 is formed as a single monolithic component with the second end 306. The second portion 360 is pivotable relative to the first portion 358 to move the first end 304 between an open position 362 and a closed position 364. FIG. 4C shows the first end 304 in the open position 362, and FIG. 4D shows the first end 304 in the closed position 364.

In the illustrative embodiment, the first end 304 further includes a latch 366 and a retainer 368. The retainer includes an aperture defined therein and extending therethrough, and the aperture is sized and shaped to receive the latch 366 to secure the latch to the retainer 368. The latch 366 is coupled to the second portion 360 for movement therewith. The retainer 368 is coupled to the first portion 358 of the first end 304 such that the retainer 368 is fixed relative to the second end 306 of the gap tine 300. When the second portion 360 is pivoted such that first end 304 is moved toward the closed position 364, the latch 366 is moved toward the retainer 368. The latch 366 extends through and is secured to the retainer 368 when the first end 304 is in the closed position 364. With this arrangement, the gap tine 300 is coupleable to the outer surface 144 of the carrier bar 140 without penetrating the outer surface 144 of the carrier bar 140.

The second end 306 of the main body 302 has a length that is substantially the same as a length of a corresponding end of the standard tine 142. The second end 306 may include indents or voids to improve manufacturability or to provide additional structural benefits. The second end 306 is configured to interact with and move cut crop and other materials during operation of the work machine 100.

In the illustrative embodiment, the gap tine 300 includes a first side 310 and a second side 312 each extending away from the main body 302 in opposite directions from one another. The first side 310 and the second side 312 extend away from the main body 302 in a direction generally perpendicular to the length or direction of extension of the second end 306. In the illustrative embodiment, the first side 310 and the second side 312 are formed as a single monolithic component with the first end 304. Specifically, the first side 310 and the second side 312 are formed as a single monolithic component with the first portion 358 of the first end 304.

The first side 310, the second side 312, and the first end 304 of the main body 302 cooperate to define a head portion 318 of the gap tine 300. The first side 310 includes an inner surface 314, and the second side 312 includes an inner surface 316. The inner surfaces 314, 316, and 308 cooperate to define an inner surface 320 of the head portion 318. The inner surface 320 of the head portion 318 is sized and shaped to correspond with the outer surface 144 of the carrier bar 140. As suggested by FIG. 4E, the inner surface 320 of the head portion 318 is in contact with the carrier bar 140 when the gap tine 300 is coupled to the carrier bar 140.

As shown in FIG. 4E, at least a portion of the first side 310 of the first gap tine 300a is positioned in the groove 160 of the c-shaped portion 154 of the first standard tine 142a when the first gap tine 300a is coupled to the carrier bar 140. When the tines 142, 300 contact cut crop and other material, the tines 142, 300 are urged to rotate relative to the carrier bar 140. Because at least a portion of the first side 310 of the first gap tine 300a is positioned in the groove 160 of the c-shaped portion 154 of the first standard tine 142a, the first side 310 of the first gap tine 300a is configured to directly contact the c-shaped portion 154 of the first standard tine 142a to prevent rotation of the first gap tine 300a about the carrier bar 140.

The first gap tine 300a is prevented from rotating relative to the carrier bar 140 without penetrating the outer surface 144 of the carrier bar 140. In other words, it should be appreciated that no fasteners or other components of the gap tines 300 penetrate the carrier bar 140 to couple the gap tines 300 to the carrier bar 140. Likewise, no fasteners or other components of the gap tines 300 penetrate the carrier bar 140 to prevent rotation of the gap tines 300 relative to the carrier bar 140. Therefore, the gap tines 300 are removable from the carrier bar 140 without the use of additional tools such as a screw driver or drill.

As shown in FIG. 4E, at least a portion of the second side 312 of the first gap tine 300a is positioned in the groove 160 of the c-shaped portion 154 of the second standard tine 142b when the first gap tine 300a is coupled to the carrier bar 140. The second side 312 of the first gap tine 300a is configured to directly contact the c-shaped portion 154 of the second standard tine 142b to prevent rotation of the first gap tine 300a about the carrier bar 140.

Further, at least a portion of the first side 310 of the second gap tine 300b is positioned in the groove 160 of the c-shaped portion 154 of the second standard tine 142b when the second gap tine 300b is coupled to the carrier bar 140. The first side 310 of the second gap tine 300b is configured to directly contact the c-shaped portion 154 of the second standard tine 142b to prevent rotation of the second gap tine 300b about the carrier bar 140.

Further, at least a portion of the second side 312 of the second gap tine 300b is positioned in the groove 160 of the c-shaped portion 154 of the third standard tine 142c when the second gap tine 300b is coupled to the carrier bar 140. The second side 312 of the second gap tine 300b is configured to directly contact the c-shaped portion 154 of the third standard tine 142c to prevent rotation of the second gap tine 300b about the carrier bar 140.

Figure 5A:
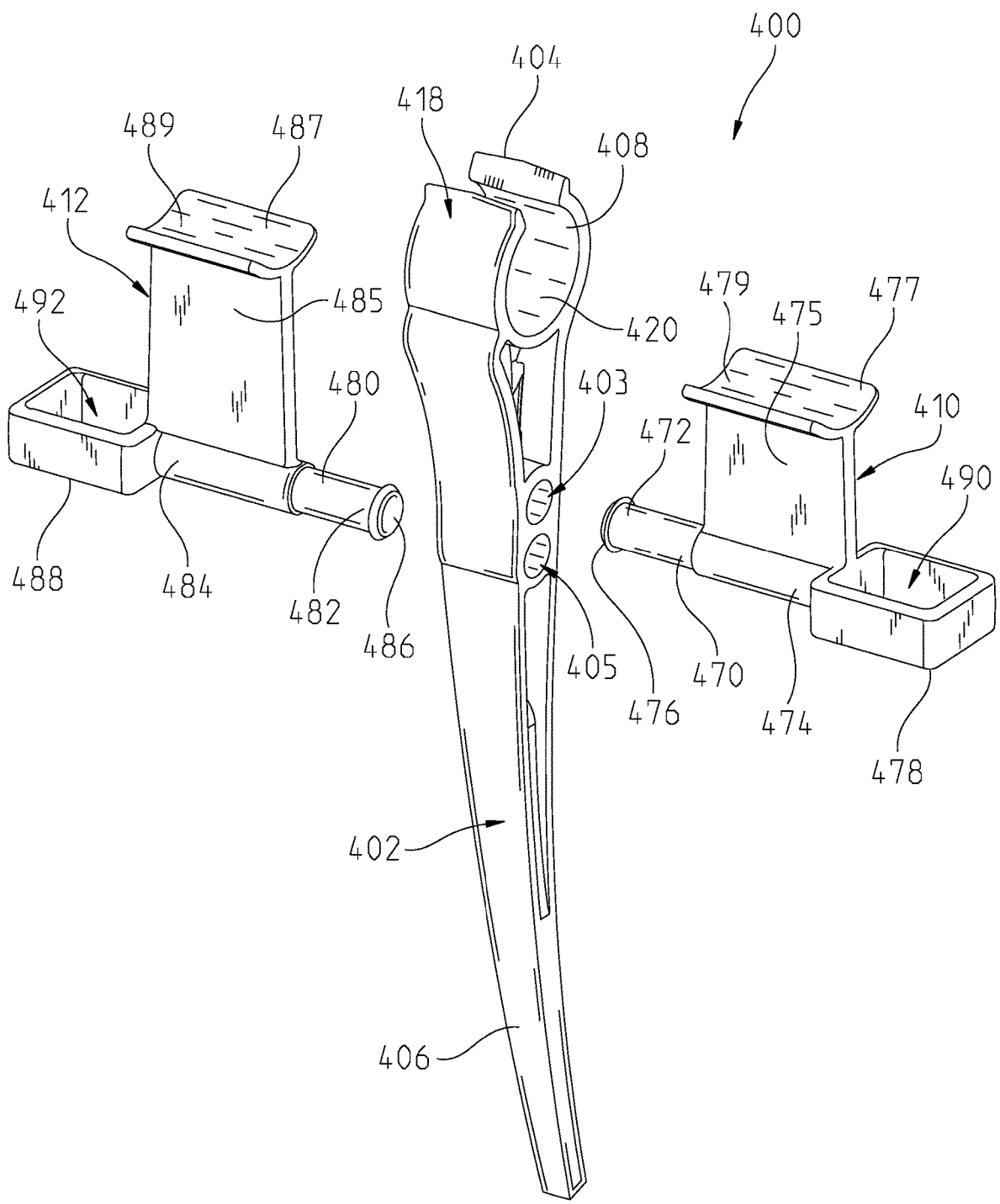
FIG. 5A illustrates a front perspective view of another gap tine.
Figure 5B:
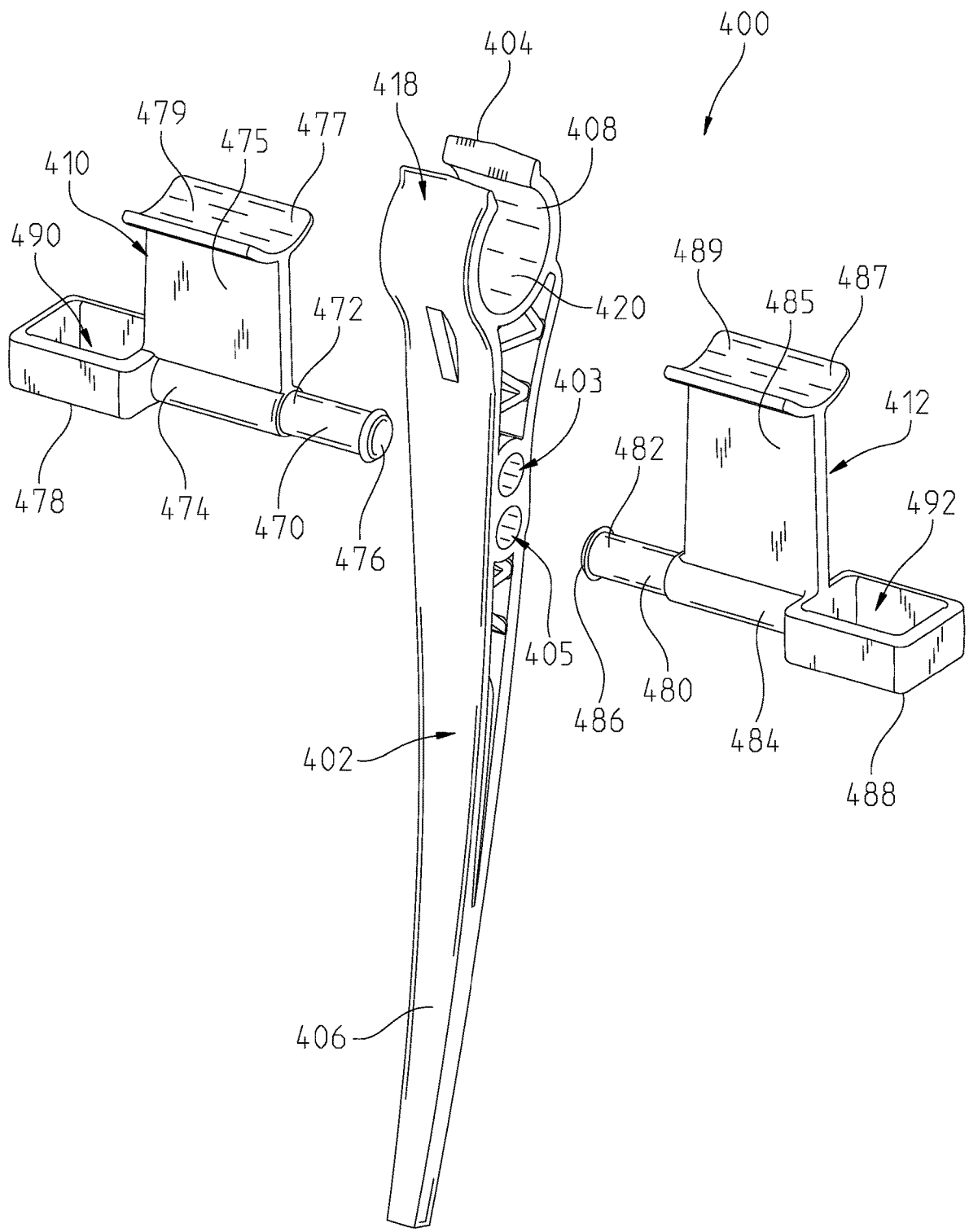
FIG. 5B illustrates a rear perspective view the gap tine shown in FIG. 5A.
Figure 5C:
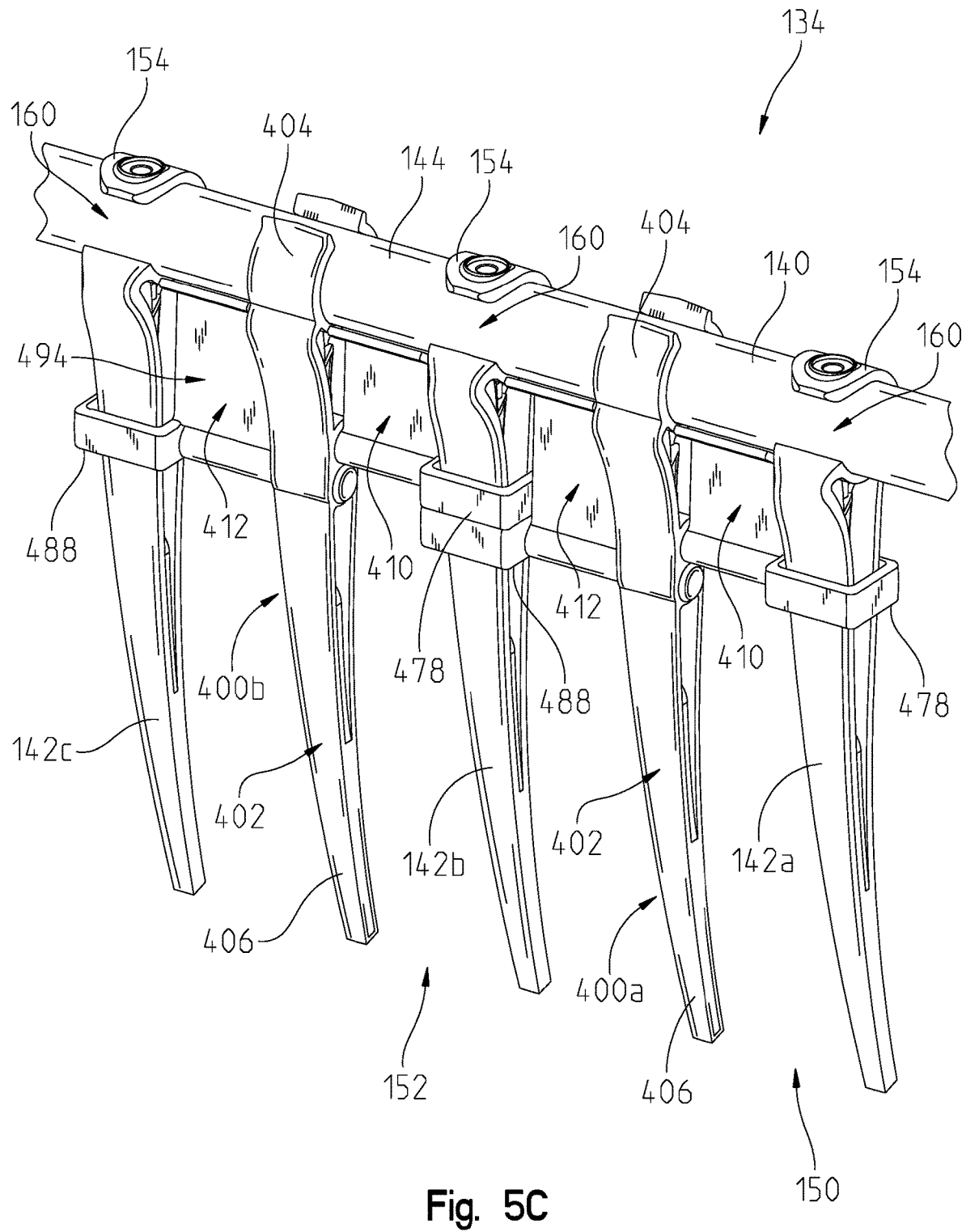
FIG. 5C illustrates a perspective view the gap tine of FIGS. 5A-B coupled to the carrier bar and positioned between standard tines.

Referring now to FIGS. 5A-C, a gap tine 400 is shown. As shown in FIG. 5C, a first gap tine 400a is positioned in the first gap 150, and a second gap tine 400b is positioned in the second gap 152. In other words, the first gap tine 400a is positioned directly adjacent and between the first and second standard tines 142a, 142b, and the second gap tine 400b is positioned directly adjacent and between the second and third standard tines 142b, 142c.

FIG. 5A illustrates a front view of the gap tine 400, and FIG. 5B illustrates a rear view of the gap tine 400. As shown in FIGS. 5A-B, each gap tine 400 includes a main body 402 including a first end 404 removably coupled to the carrier bar 140 and a second end 406 extending away from the carrier bar 140 when the first end 404 is coupled to the carrier bar 140. The first end 404 is arcuate and includes an inner surface 408 sized and shaped to correspond with the outer surface 144 of the carrier bar 140.

In the illustrative embodiment, the first end 404 is a deflectable, resilient portion that may be removably coupled to the carrier bar 140. The first end 404 is arranged in a snap-fit connection with the carrier bar 140 to couple the gap tine 400 to the carrier bar 140. Thus, the first end 404 may be referred to as a snap-fit mechanism. Therefore, the gap tine 400 is coupleable to the outer surface 144 of the carrier bar 140 without penetrating the outer surface 144 of the carrier bar 140.

It should be appreciated that the snap-fit mechanism may be replaced with the lockable hinge mechanism described above in some embodiments directed to the gap tine 400.

The second end 406 of the main body 402 has a length that is substantially the same as a length of a corresponding end of the standard tine 142. The second end 406 may include indents to improve manufacturability or to provide additional structural benefits. The second end 406 is configured to interact with and move cut crop and other materials during operation of the work machine 100. The gap tine 400 includes a first aperture 403 and a second aperture 405 each defined in the main body 402 and extending therethrough. The first aperture 403 is aligned with and positioned above the second aperture 405.

In the illustrative embodiment, the gap tine 400 includes a first side 410 and a second side 412 each coupleable to and removable from the main body 402. The first side 410 includes an arm 470 extending from a first end 472 to a second end 474. A latch 476 is defined at the first end 472, and a retainer 478 is defined at the second end 474. The first end 472 is sized and shaped to be inserted into the first aperture 403 such that the latch 476 protrudes beyond the first aperture 403 to secure the first side 410 to the main body 402. The first side 410 further includes a shield 475 coupled to the arm 470 and extending perpendicular to the direction of extension of the arm 470. An arcuate portion 477 is defined at an end of the shield 475 opposite the arm 470, and the arcuate portion 477 includes an inner surface 479. In some embodiments, some or all of the components of the first side 410 are formed as a single monolithic component with each other.

The second side 412 includes an arm 480 extending from a first end 482 to a second end 484. A latch 486 is defined at the first end 482, and a retainer 488 is defined at the second end 484. The first end 482 is sized and shaped to be inserted into the second aperture 405 such that the latch 486 protrudes beyond the second aperture 405 to secure the second side 412 to the main body 402. The second side 412 further includes a shield 485 coupled to the arm 480 and extending perpendicular to the direction of extension of the arm 480. The shield 485 of the second side 412 has a length of extension greater than a length of extension of the shield 475 of the first side 410. An arcuate portion 487 is defined at an end of the shield 485 opposite the arm 480, and the arcuate portion 487 includes an inner surface 489. In some embodiments, some or all of the components of the second side 412 are formed as a single monolithic component with each other.

The arcuate portion 477 of first side 410, the arcuate portion 487 of the second side 412, and the first end 404 of the main body 402 cooperate to define a head portion 418. The inner surfaces 479, 489 of the arcuate portions 477, 487 cooperate with the inner surface 408 of the first end 404 to define an inner surface 420 of the head portion 418. The inner surface 420 of the head portion 418 is sized and shaped to correspond with the outer surface 144 of the carrier bar 140. As suggested by FIG. 5C, the inner surface 420 of the head portion 418 is in contact with the carrier bar 140 when the gap tine 400 is coupled to the carrier bar 140.

It should be appreciated that when the first and second sides 410, 412 are coupled to the main body 402, the first and second sides 410, 412 extend away from the main body 402 in a direction generally perpendicular to the length or direction of extension of the second end 406 of the main body 402.

Referring still to FIGS. 5A-C, the retainer 478 includes an aperture 490 defined therein, and the retainer 488 includes an aperture 492 defined therein. The apertures 490, 492 are sized and shaped to correspond with the size and shape of the standard tines 142 such that the standard tines 142 may be inserted in the apertures 490, 492.

As suggested in FIG. 5C, the first standard tine 142a is position in the aperture 490 of the first gap tine 400a. Further, the second standard tine 142b is positioned in, both, the aperture 492 of the first gap tine 400a and the aperture 490 of the second gap tine 400b. Further, the third standard tine 142c is positioned in the aperture 492 of the second gap tine 400b. In use, the second gap tine 400b is coupled to the second and third standard tines 142b, 142c prior to the first gap tine 400a being coupled to the first and second standard tines 142a, 142b. Therefore, the retainer 478 of the second gap tine 400b is positioned above retainer 488 of the first gap tine 400a. As shown in FIG. 5C, the shields 475, 485 of each gap tine 400 cooperate to form a shield wall 494 to maximize a surface area for contacting cut crop and other material during operation of the work machine 100.

When the tines 142, 400 contact cut crop and other material, the tines 142, 400 are urged to rotate relative to the carrier bar 140. Because the standard tines 142 are positioned in the apertures 490, 492 of the retainers 478, 488 of the gap tines 400, the standard tines 142 are configured to directly contact the gap tines 400 to prevent rotation of the gap tines 400 about the carrier bar 140.

The gap tines 400 are prevented from rotating relative to the carrier bar 140 without penetrating the outer surface 144 of the carrier bar 140. In other words, it should be appreciated that no fasteners or other components of the gap tines 400 penetrate the carrier bar 140 to couple the gap tines 400 to the carrier bar 140. Likewise, no fasteners or other components of the gap tines 400 penetrate the carrier bar 140 to prevent rotation of the gap tines 400 relative to the carrier bar 140. Therefore, the gap tines 400 are removable from the carrier bar 140 without the use of additional tools such as a screw driver or drill.

Figure 6A:
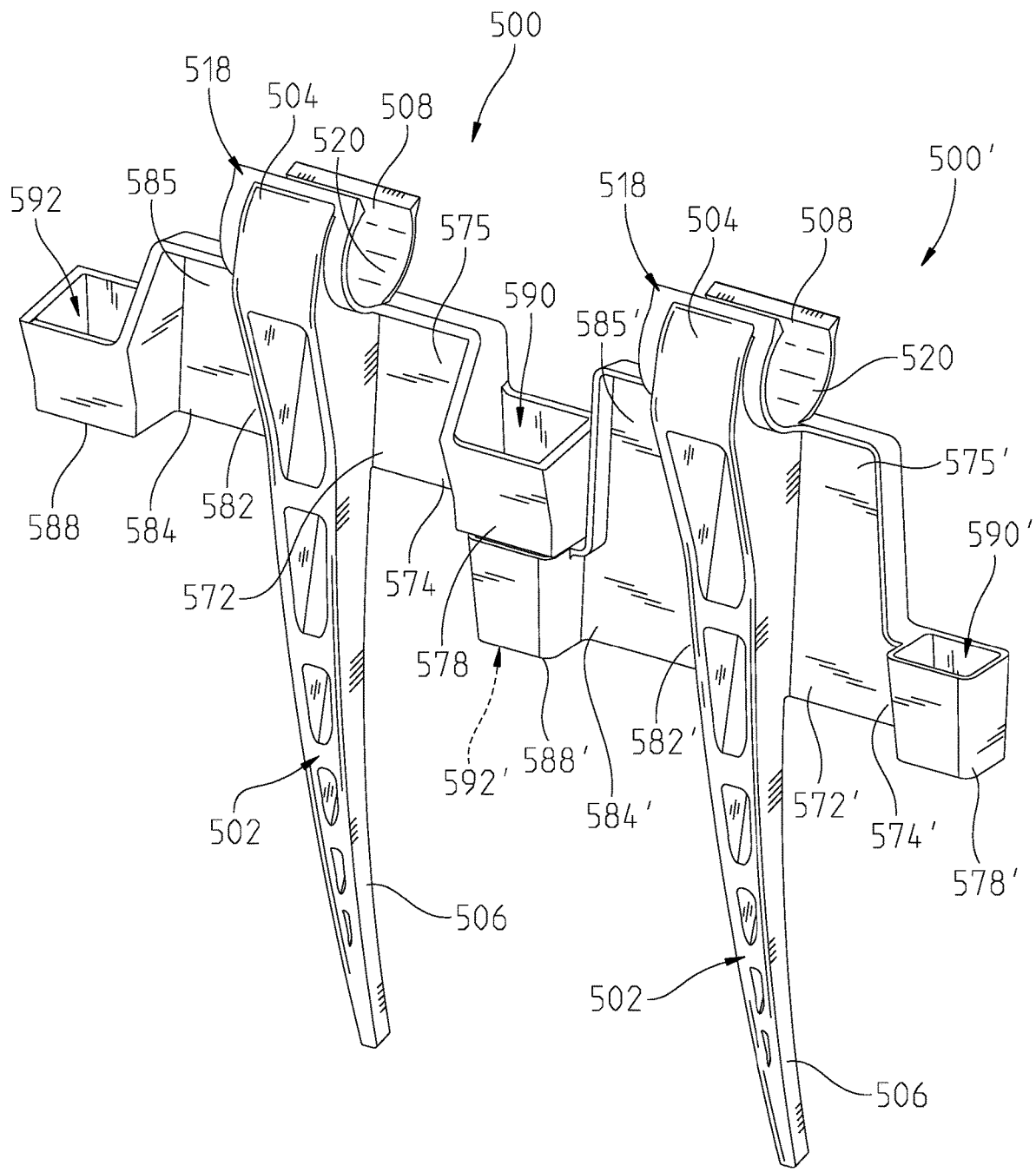
FIG. 6A illustrates a front perspective view of another gap tine.
Figure 6B:
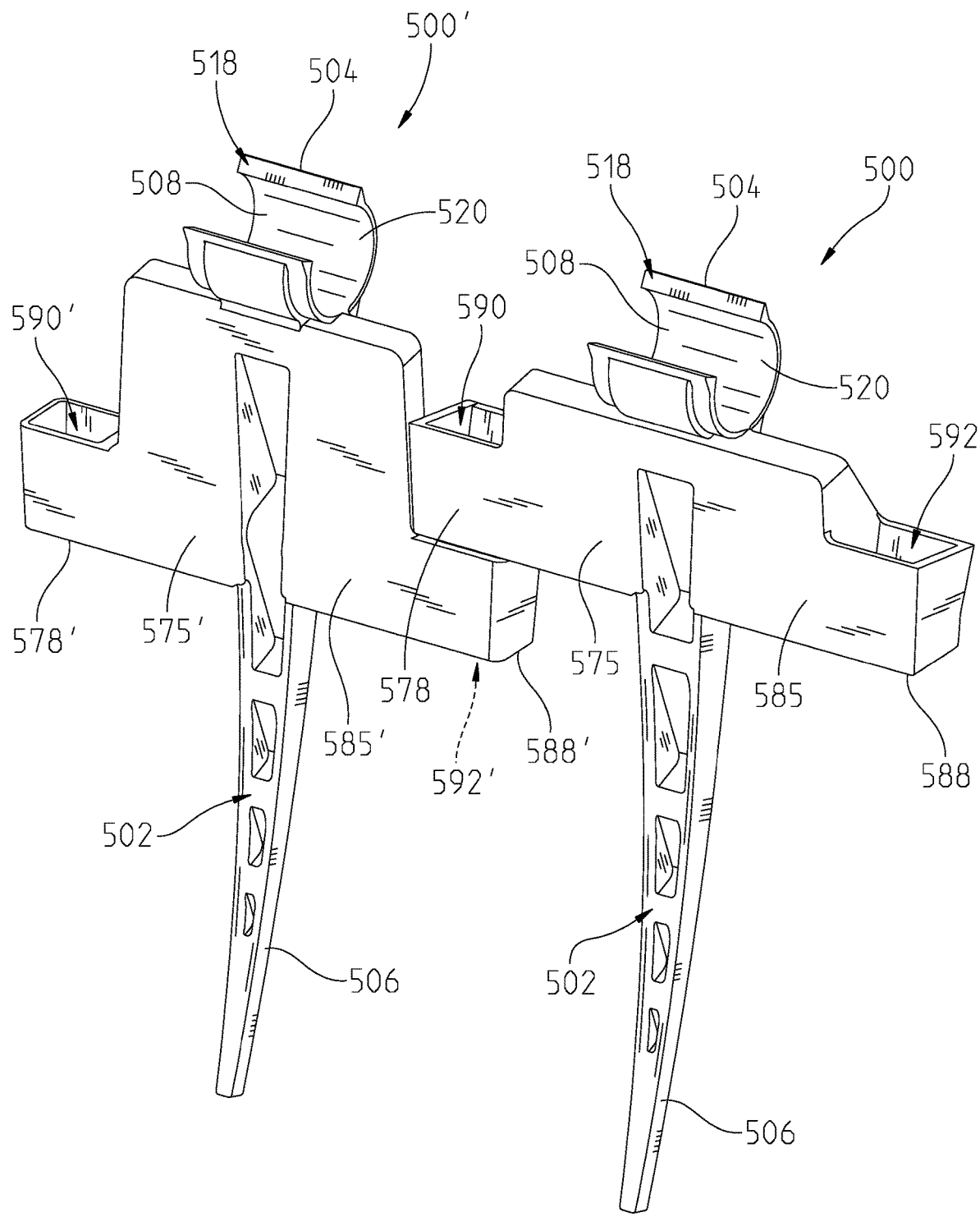
FIG. 6B illustrates a rear perspective view the gap tine shown in FIG. 6A.
Figure 6C:
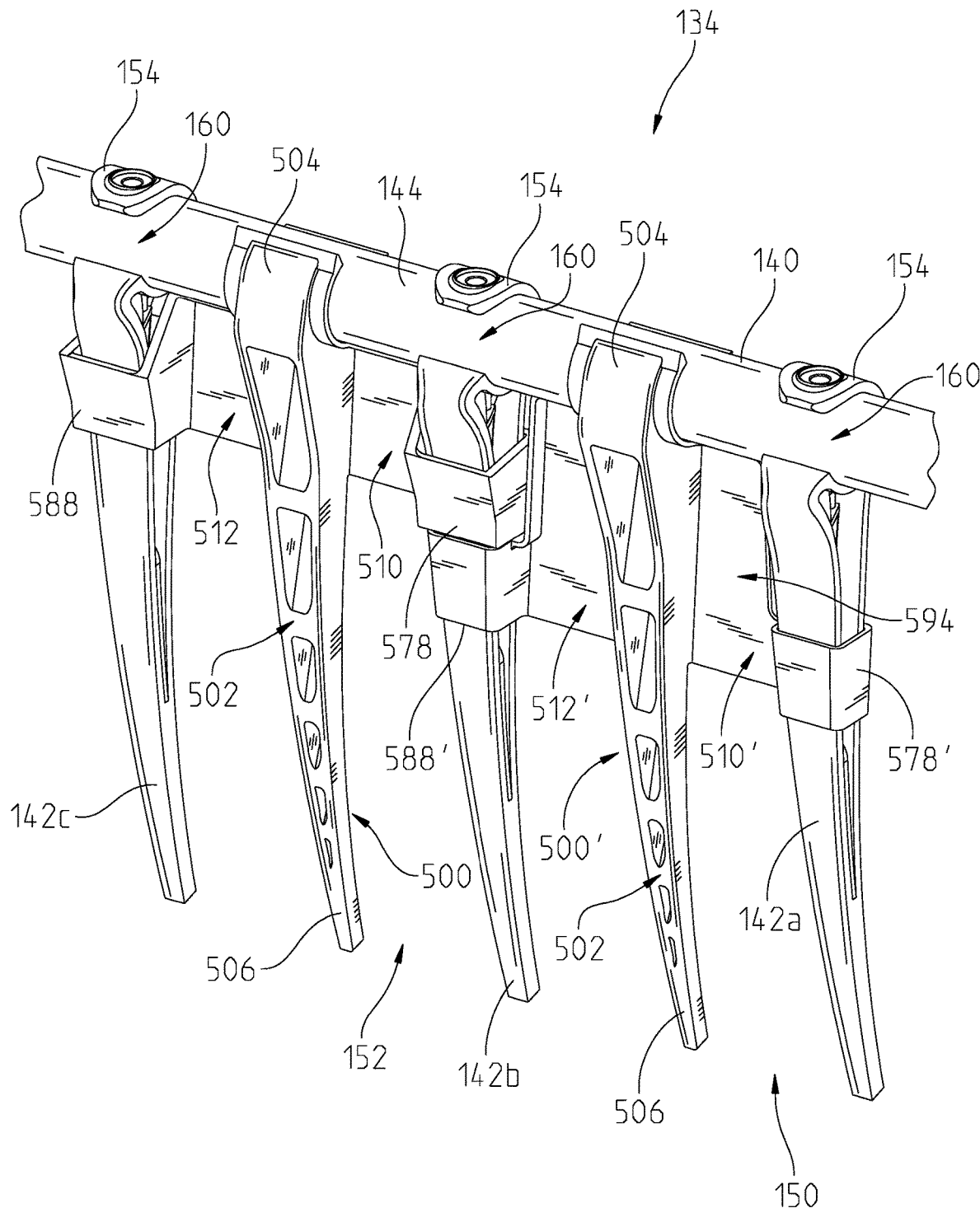
FIG. 6C illustrates a perspective view the gap tine of FIGS. 6A-B coupled to the carrier bar and positioned between standard tines.

Referring now to FIGS. 6A-C, gap tines 500 and 500' are shown. As shown in FIG. 6C, a first gap tine 500' is positioned in the first gap 150, and a second gap tine 500 is positioned in the second gap 152. In other words, the first gap tine 500' is positioned directly adjacent and between the first and second standard tines 142a, 142b, and the second gap tine 500 is positioned directly adjacent and between the second and third standard tines 142b, 142c.

FIG. 6A illustrates a front view of the gap tines 500 and 500', and FIG. 6B illustrates a rear view of the gap tines 500 and 500'. As shown in FIGS. 6A-B, each gap tine 500, 500' includes a main body 502 including a first end 504 removably coupled to the carrier bar 140 and a second end 506 extending away from the carrier bar 140 when the first end 504 is coupled to the carrier bar 140. The first end 504 is arcuate and includes an inner surface 508 sized and shaped to correspond with the outer surface 144 of the carrier bar 140. At times, the first end 504 may be referred to as a head portion 518, and the inner surface 508 thereof may be referred to as an inner surface 520 of the head portion 518.

In some embodiments, the first end 504 is a deflectable, resilient portion that may be removably coupled to the carrier bar 140. The first end 504 is arranged in a snap-fit connection with the carrier bar 140 to couple the gap tine 500 or 500' to the carrier bar 140. Thus, the first end 504 may be referred to as a snap-fit mechanism. Therefore, the gap tines 500, 500' are coupleable to the outer surface 144 of the carrier bar 140 without penetrating the outer surface 144 of the carrier bar 140.

It should be appreciated that the snap-fit mechanism may be replaced with the lockable hinge mechanism described above in some embodiments directed to the gap tines 500, 500'.

The second end 506 of the main body 502 has a length that is substantially the same as a length of a corresponding end of the standard tine 142. The second end 506 may include indents to improve manufacturability or to provide additional structural benefits. The second end 506 is configured to interact with and move cut crop and other materials during operation of the work machine 100.

In the illustrative embodiment, the gap tine 500 includes a first side 510 and a second side 512 each coupled to the main body 502. The first side 510 includes a shield 575 extending from a first end 572 to a second end 574. A retainer 578 is defined at the second end 574. In some embodiments, some or all of the components of the first side 510 are formed as a single monolithic component with each other. The second side 512 includes a shield 585 extending from a first end 582 to a second end 584. A retainer 588 is defined at the second end 584. In some embodiments, some or all of the components of the second side 512 are formed as a single monolithic component with each other. It should be appreciated that the first and second sides 510, 512 extend away from the main body 502 in a direction generally perpendicular to the length or direction of extension of the second end 506 of the main body 502.

The gap tine 500' differs from the gap tine 500 in that shields 575', 585' of the gap tine 500' have a length of extension greater than a length of extension of the shields 575, 585 of the gap tine 500. In the illustrative embodiment, the gap tines 500' includes a first side 510' and a second side 512' each coupled to the main body 502. The first side 510' includes the shield 575' extending from a first end 572' to a second end 574'. A retainer 578' is defined at the second end 574'. In some embodiments, some or all of the components of the first side 510' are formed as a single monolithic component with each other. The second side 512' includes the shield 585' extending from a first end 582' to a second end 584'. A retainer 588' is defined at the second end 584'. In some embodiments, some or all of the components of the second side 512' are formed as a single monolithic component with each other. It should be appreciated that the first and second sides 510', 512' extend away from the main body 502 in a direction generally perpendicular to the length or direction of extension of the second end 506 of the main body 502.

Referring still to FIGS. 6A-C, the retainer 578 includes an aperture 590 defined therein, and the retainer 588 includes an aperture 592 defined therein. The apertures 590, 592 are sized and shaped to correspond with the size and shape of the standard tines 142 such that the standard tines 142 may be inserted in the apertures 590, 592. Similarly, the retainer 578' includes an aperture 590' defined therein, and the retainer 588' includes an aperture 592' defined therein. The apertures 590', 592' are sized and shaped to correspond with the size and shape of the standard tines 142 such that the standard tines 142 may be inserted in the apertures 590', 592'.

It should be appreciated that the retainers are positioned at a bottom edge of each shield, and therefore, when the gap tines 500, 500' are positioned adjacent one another, the retainer 578 of the gap tine 500 is positioned above the retainer 588' of the gap tine 500'. The retainers 578', 588' have narrower apertures than those of the retainers 578, 588. This is because the apertures of the retainers correspond to the shape of the standard tines 142, and the standard tines 142 taper as they extend to their furthest point from the first end 504.

As suggested in FIG. 6C, the first standard tine 142a is position in the aperture 590' of the gap tine 500'. Further, the second standard tine 142b is positioned in, both, the aperture 592' of the gap tine 500' and the aperture 590 of the gap tine 500. Further, the third standard tine 142c is positioned in the aperture 592 of the gap tine 500. In use, the gap tine 500 is coupled to the second and third standard tines 142b, 142c prior to the gap tine 500' being coupled to the first and second standard tines 142a, 142b. One to two more gap tines 500 (relative to the number of gap tines 500') are coupled to the carrier bar 140, at any given time during the assembly process.

As shown in FIG. 6C, the shields 575, 585, 575', 585' of each gap tine 500, 500' cooperate to form a shield wall 594 to maximize a surface area for contacting cut crop and other material during operation of the work machine 100.

When the tines 142, 500, 500' contact cut crop and other material, the tines 142, 500, 500' are urged to rotate relative to the carrier bar 140. Because the standard tines 142 are positioned in the apertures of the retainers of the gap tines 500, 500', the standard tines 142 are configured to directly contact the gap tines 500, 500' to prevent rotation of the gap tines 500, 500' about the carrier bar 140.

The gap tines 500, 500' are prevented from rotating relative to the carrier bar 140 without penetrating the outer surface 144 of the carrier bar 140. In other words, it should be appreciated that no fasteners or other components of the gap tines 500, 500' penetrate the carrier bar 140 to couple the gap tines 500, 500' to the carrier bar 140. Likewise, no fasteners or other components of the gap tines 500, 500' penetrate the carrier bar 140 to prevent rotation of the gap tines 500, 500' relative to the carrier bar 140. Therefore, the gap tines 500, 500' are removable from the carrier bar 140 without the use of additional tools such as a screw driver or drill.

While the disclosure has been illustrated and described in detail in the drawings and foregoing description, such illustration and description is to be considered as exemplary and not restrictive in character, it being understood that illustrative embodiment(s) have been shown and described and that all changes and modifications that come within the spirit of the disclosure are desired to be protected. It will be noted that alternative embodiments of the present disclosure may not include all of the features described yet still benefit from at least some of the advantages of such features. Those of ordinary skill in the art may readily devise their own implementations that incorporate one or more of the features of the present disclosure and fall within the spirit and scope of the present invention as defined by the appended claims.

The invention claimed is:

1. A reel assembly for a harvester head of agricultural machine comprising:
a platform;
a reel assembly coupled to the platform, the reel assembly including:
a central bar rotatable relative to the platform;
a carrier bar coupled to central bar and configured to rotate about the central bar;
a first standard tine coupled to the carrier bar by penetrating an outer surface of the carrier bar; and
a first gap tine removably coupled to the carrier bar without penetrating the outer surface of the carrier bar and positioned adjacent the first standard tine;
wherein the first standard tine is configured to directly contact the first gap tine when the first gap tine is coupled to the carrier bar to prevent rotation of the first gap tine relative to the carrier bar.

2. The reel assembly of claim 1, wherein the first gap tine includes:
a main body including a first end removably coupled to the carrier bar and a second end extending away from the carrier bar when the first end is coupled to the carrier bar, and
a first side extending away from the main body and configured to contact the first standard tine to prevent rotation of the first gap tine about the carrier bar.

3. A reel assembly for a harvester head of agricultural machine comprising:
a carrier bar configured to rotate about a central bar;
a first standard tine coupled to the carrier bar; and
a first gap tine removably coupled to the carrier bar and positioned adjacent the first standard tine, the first gap tine including a main body and a first side extending away from the main body;
wherein the first standard tine is configured to directly contact the first gap tine when the first gap tine is coupled to the carrier bar to prevent rotation of the first gap tine relative to the carrier bar;
wherein the first standard tine includes a c-shaped portion coupled to and extending at least partially around the carrier bar;
wherein the c-shaped portion of the first standard tine includes a first end, a second end, and a groove defined between the first end and the second end; and
wherein the first side of the first gap tine is positioned in the groove when the first gap tine is coupled to the carrier bar.

4. The reel assembly of claim 2, further comprising:
a second standard tine that is coupled to the carrier bar and spaced apart from the first standard tine; and
wherein the first gap tine includes a second side coupled to and extending away from the main body opposite the first side and configured to contact the second standard tine to prevent rotation of the first gap tine about the carrier bar.

5. The reel assembly of claim 4, further comprising:
a second gap tine; and
a third standard tine that is coupled to the carrier bar and spaced apart from the first and second standard tines;
wherein the second gap tine includes a first side configured to contact the second standard tine to prevent rotation of the second gap tine about the carrier bar and a second side configured to contact the third standard tine to prevent rotation of the second gap tine about the carrier bar.

6. The reel assembly of claim 2, wherein the first end of the first gap tine defines an arcuate deflectable portion configured to removably couple the first gap tine to the carrier bar.

7. The reel assembly of claim 2, wherein the first end of the first gap tine includes:
a first portion,
a second portion pivotable relative to the first portion to move the first end between an open position and a closed position; and
a latch coupled to the second portion; and
wherein when the first end is in the closed position, the latch fixes the second portion relative to the first portion.

8. The reel assembly of claim 2, wherein the first side of the first gap tine includes an aperture;
wherein the first standard tine is positioned in the aperture when the first gap tine is coupled to the carrier bar.

9. The reel assembly of claim 2, wherein the first side of the first gap tine is removably coupled to the main body of the first gap tine.

10. A reel assembly for a harvester head of agricultural machine comprising:
a carrier bar;
a first standard tine and a second standard tine each including a first end coupled to the carrier bar and a second end extending away from the carrier bar;
a gap defined between the first standard tine and the second standard tine; and
a gap tine positioned in the gap and including a first end coupled to the carrier bar and a second end extending away from the carrier bar;
wherein the gap tine is configured to contact the first standard tine and the second standard tine to limit rotation of the gap tine relative to the carrier bar; and
wherein the first end of the first standard tine and the first end of the second standard tine are each shaped differently than the first end of the gap tine in a manner that is visible when each of the first standard tine, the second standard tine, and the gap tine are coupled to the carrier bar.

11. The reel assembly of claim 10, wherein the carrier bar includes an outer surface; and
the gap tine is coupled to the outer surface of the carrier bar without penetrating the outer surface of the carrier bar.

12. The reel assembly of claim 10, wherein the gap tine includes:
a main body that includes the first end and the second end of the gap tine,
a first side coupled to and extending away from the main body and configured to contact the first standard tine to limit rotation of the gap tine about the carrier bar, and
a second side coupled to and extending away from the main body opposite the first side, and configured to contact the second standard tine to limit rotation of the gap tine about the carrier bar.

13. The reel assembly of claim 12, wherein the first ends of the first standard tine and second standard tine are each fastened to the carrier bar;
wherein the first side of the gap tine extends along the carrier bar into a groove defined in the first end of the first standard tine; and wherein the second side of the gap tine extends along the carrier bar into a groove defined in the first end the second standard tine.

14. The reel assembly of claim 12, wherein the first side of the gap tine includes a first aperture and the second side of the gap tine includes a second aperture;
    wherein the first standard tine is positioned in the first aperture when the gap tine is coupled to the carrier bar; and
    wherein the second standard tine is positioned in the second aperture when the gap tine is coupled to the carrier bar.

15. The reel assembly of claim 14, wherein the gap tine is a first gap tine;
    wherein the reel assembly further comprises:
        a second gap tine including: a main body having a first end removably coupled to the carrier bar, a first side and a second side each extending from the main body opposite each other, a first aperture defined in the first side, and a second aperture defined in the second side; and
        wherein the second standard tine is positioned in the first aperture of the second gap tine; and
        wherein the first aperture of the second gap tine is positioned above the second aperture of the first gap tine when the second gap tine is coupled to the carrier bar.

16. The reel assembly of claim 10, wherein the first end of the gap tine is snap-fittingly coupled to the carrier bar.

17. The reel assembly of claim 10, wherein the gap tine includes a main body having a first end removably coupled to the carrier bar;
    wherein the first end includes:
        a first portion,
        a second portion pivotable relative to the first portion between an open position and a closed position of the first end; and
    wherein the first end is lockable in the closed position.

18. The reel assembly of claim 1, wherein the first gap tine is coupled to a portion of the carrier bar having a circular cross section.

19. The reel assembly of claim 1, wherein a fastener penetrates the outer surface of the carrier bar to couple the first gap tine to the carrier bar.

\* \* \* \* \*